US005816186A

United States Patent [19]

Shepherd

[11] Patent Number: 5,816,186

[45] Date of Patent: Oct. 6, 1998

[54] WHISTLE

[75] Inventor: Charles G. Shepherd, Oakville, Canada

[73] Assignee: Fox 40 International Inc., Hamilton, Canada

[21] Appl. No.: 688,939

[22] Filed: Jul. 31, 1996

[51] Int. Cl.[6] .......................................................... G01K 5/00

[52] U.S. Cl. ........................................ 116/137 R; 116/141

[58] Field of Search ................................ 116/137 R, 141; 446/204

[56] References Cited

U.S. PATENT DOCUMENTS

| | | | |
|---|---|---|---|
| 321,202 | 6/1885 | Fisher . | |
| 394,243 | 12/1888 | Briggs . | |
| 396,821 | 1/1889 | Johnson . | |
| 492,887 | 3/1893 | Hall . | |
| 632,184 | 8/1899 | Johnson . | |
| 1,094,006 | 4/1914 | O'Reilly . | |
| 2,056,623 | 10/1936 | Scott . | |
| 2,113,396 | 4/1938 | Butterfield | 116/137 R |
| 4,280,299 | 7/1981 | Oka . | |
| 4,359,961 | 11/1982 | Seron | 116/137 R |
| 4,821,670 | 4/1989 | Foxcroft | 116/137 R |
| 5,086,726 | 2/1992 | Sharp | 116/137 R |
| 5,329,872 | 7/1994 | Wright | 116/137 R |

FOREIGN PATENT DOCUMENTS

| | | | |
|---|---|---|---|
| 20 | 1/1915 | United Kingdom | 446/204 |

*Primary Examiner*—William A. Cuchlinski, Jr.
*Assistant Examiner*—Willie Morris Worth

[57] ABSTRACT

A whistle is provided which will create two frequencies when blown to produce a beat. The whistle has a mouthpiece defining an inlet opening and an inlet passageway extending axially from the inlet opening to a main body which has two similar chambers extending generally axially. Air from the passageway engages two splitter edges associated one with each of the chambers. A lanyard receiver extends axially from the main body remote from the mouthpiece and defines a transverse cavity connected to one of the axial chambers. The whistle is made from first and second parts having mating peripheral surfaces where a joint is made. The arrangement of the whistle is such that two resonant frequencies are created each having a different audible frequency to create a beat. This is achieved in a simple, light and compact structure which is simple to assemble resulting in a relatively inexpensive whistle having good sound characteristics.

4 Claims, 3 Drawing Sheets

WHISTLE

FIELD OF THE INVENTION

This invention relates to a whistle of the type commonly referred to as a "pea-less" whistle and which relies on beats resulting from resonant harmonics in adjacent chambers having unequal volumes. More particularly, the invention relates to a simple two chamber whistle having a mandolin shape.

BACKGROUND OF THE INVENTION

Whistles are used for many purposes ranging from use by referees to control sports events to emergency use to attract attention. The required characteristics of whistles depend on the intended use. For instance, a professional referee needs a whistle which responds reliably to produce a loud noise so that the referee can control a game regardless of crowd noise. A whistle which has been proven to be suitable for such use is described in U.S. patent Ser. No. 4,821,670.

In some circumstances a simpler whistle would suffice. Examples would include uses by teachers and by persons who carry a simple whistle to attract attention or to sound an alert. These simpler whistles should preferably be inexpensive and yet be relatively reliable and produce a loud noise when blown.

The present invention is directed to a simpler whistle which is relatively small and inexpensive. Such a whistle should be simple to make and assemble, and would preferably be of light weight plastics material using a minimum of material. The whistle should provide a loud noise when blown and preferably be of a style which ensures that the user has no difficulty in using the whistle.

It is therefore among the objects of the invention to provide a simple compact whistle for occasional use which is easy to manufacture and assemble and is both light weight and inexpensive.

SUMMARY OF THE INVENTION

A whistle is provided which will create two frequencies when blown to produce a beat. The whistle has a mouthpiece defining an inlet opening and an inlet passageway extending axially from the inlet opening to a main body which has two similar chambers extending generally axially. Air from the passageway engages two splitter edges associated one with each of the chambers.

A lanyard receiver extends axially from the main body remote from the mouthpiece and defines a transverse cavity connected to one of the axial chambers. The whistle is made from first and second parts having mating peripheral surfaces where a joint is made.

The arrangement of the whistle is such that two resonant frequencies are created each having a different audible frequency to create a beat. This is achieved in a simple, light and compact structure which is simple to assemble resulting in a relatively inexpensive whistle having good sound characteristics.

BRIEF DESCRIPTION OF THE PREFERRED EMBODIMENT

Figure 1:
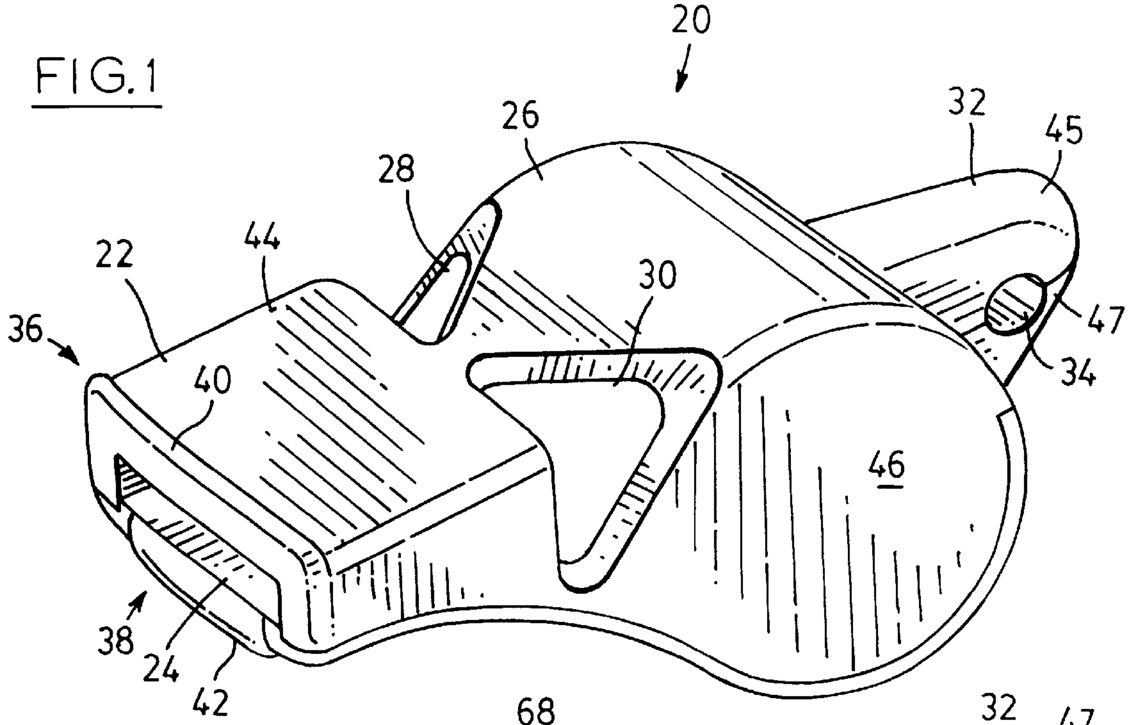
FIG. 1 is an isometric view from the mouthpiece end of a whistle according to a preferred embodiment of the invention.

Reference is first made to FIG. 1 which illustrates a whistle designated generally by the numeral 20 and including a mouthpiece 22 leading from an inlet opening 24 to a main body 26. A pair of splitter edges 28, 30 are formed on the main body for creating resonance as will be explained. The main body and mouthpiece combine to form a so-called "mandolin shape" extending generally axially from the inlet opening 24, and a lanyard receiver 32 projects axially from the main body 26 remote from the mouthpiece to define a transverse opening 34 for receiving a lanyard or key ring (not shown).

As will be described in more detail with reference to FIGS. 3 and 4, the whistle 20 is made up of first (or upper) and second (or lower) parts 36, 38 indicated generally in FIG. 1. Together these parts define the mouthpiece 22 and main body and lanyard receiver 32.

An upper wall 44 extends along the mouthpiece formed by the first part 36 and curves around the main body terminating in an upper portion 45 of the lanyard receiver 32. Side walls 46, 48 are made up from both parts 36, 38 as will be described and these side walls extend to form part of the mouthpiece as well as the main side wall of the main body. The lanyard receiver is completed by a lower portion 47 forming part of the lower part 38.

Figure 2:
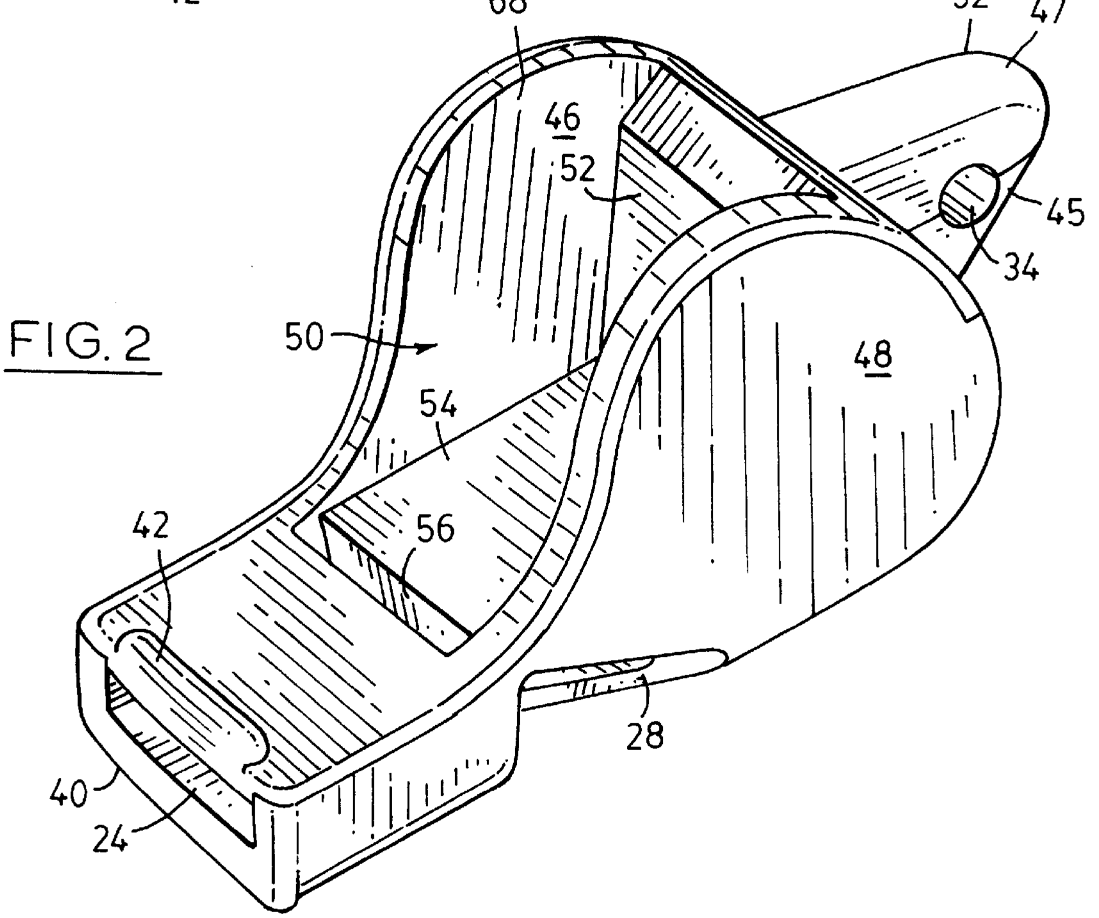
FIG. 2 is a view similar to FIG. 1 with the whistle inverted.

It will be seen in FIG. 2 that the mandolin shape is the result primarily of the shapes of the side walls 46, 48. These walls are spaced to either side of a recess 50 terminating at a transverse wall 52 adjacent the lanyard receiver 32 and extending downwardly from the underside of a platform 54. A moulding recess 56 simply reduces the material (and hence the weight) and has no structural significance.

It will also be seen in FIGS. 1 and 2 that the mouthpiece is associated with a lip 40 on the first part 36 and a downward protuberance 42 on the second part 38 to permit the user to retain the whistle in the mouth using lips and/or teeth.

Figure 3:
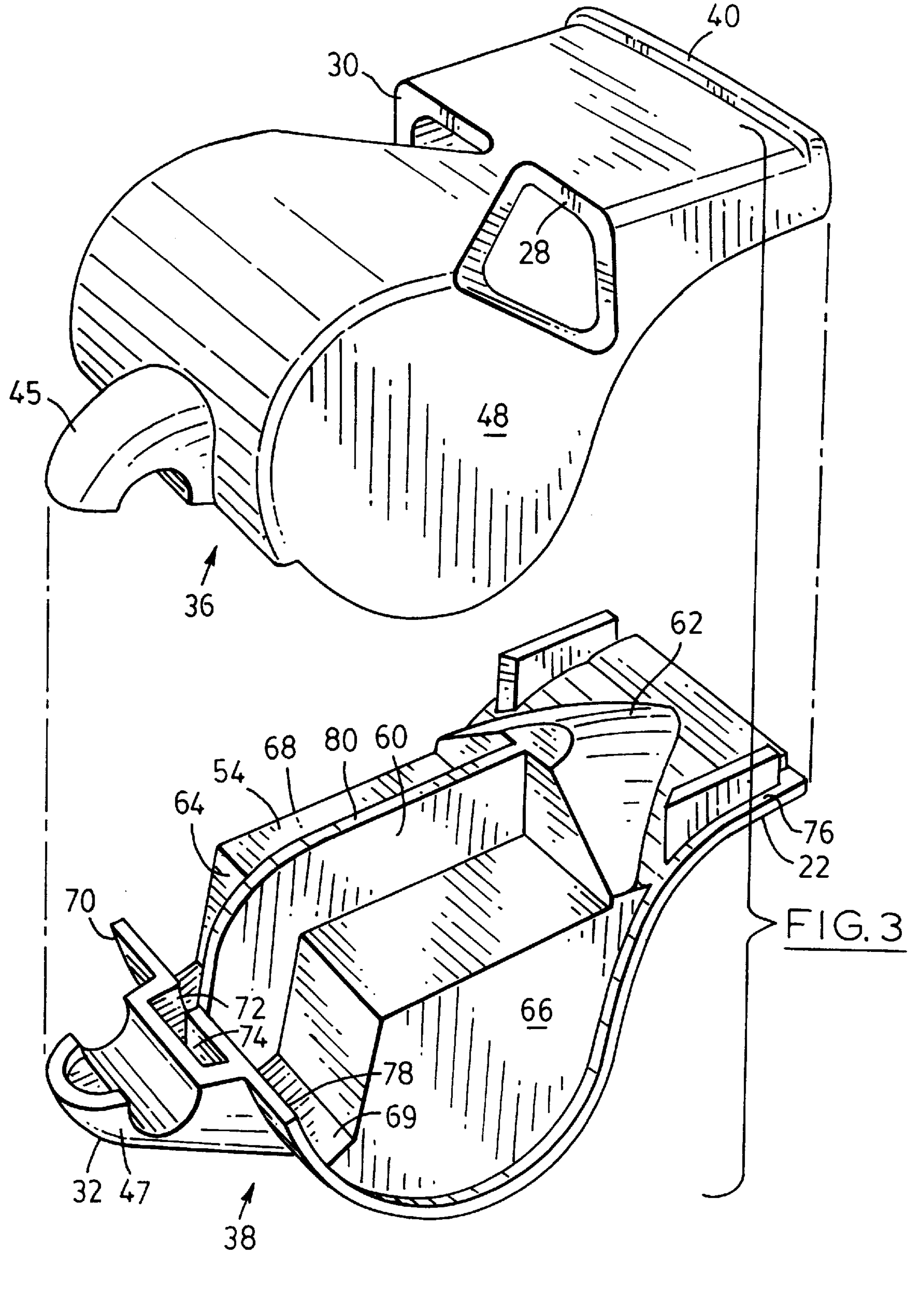
FIG. 3 is a view similar to FIG. 1 from the outer end of the whistle and showing upper and lower parts of the whistle prior to assembly.

As seen in FIG. 3, the second or lower part 38 defines the platform 54 which is divided by a central upright wall 60 extending axially from an air deflector 62 positioned centrally in the mouthpiece 22 so that air entering the inlet 24 (FIG. 1) will be split equally. The platform 54 ends at the transverse wall 64 and the dividing wall 60 continues downwardly maintaining the separation to either side.

The second part 38 also defines inner side walls 66 and 68, the latter of which is seen in FIG. 2. The transverse wall 64 meets the inner side walls 66 and an angled and generally axial bottom wall 69 combines with a curved outer end wall 70 to meet the dividing wall 60 thereby forming a recess which will partially define chambers in the whistle. It will be evident that when the first part 36 is engaged with the second part 38, closed chambers are created. This will become more apparent after describing FIG. 4. For the moment it is sufficient to indicate that there are two similar chambers divided by the upright wall 60 with one of the chambers having communication through a gap 72 to a transverse cavity 74 formed in the lanyard receiver 32.

Figure 4:
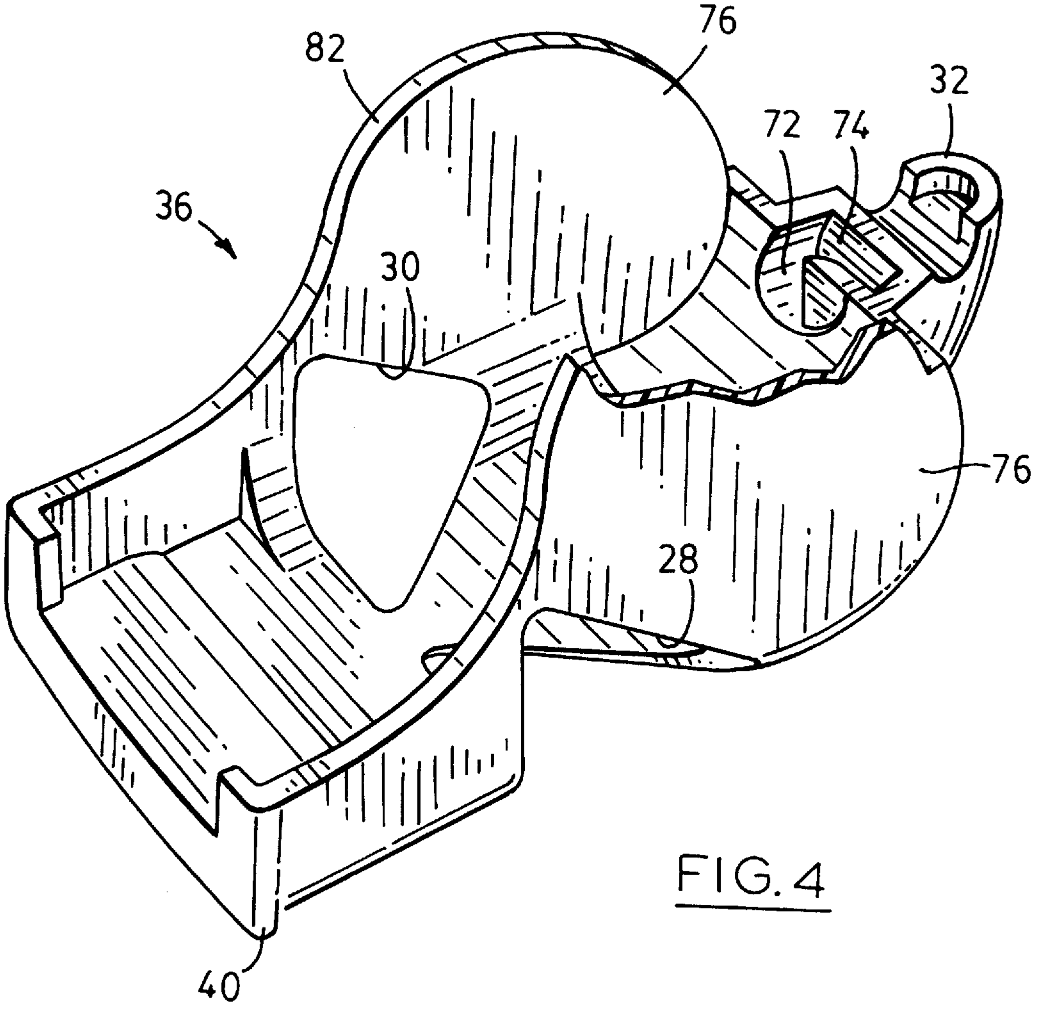
FIG. 4 is an isometric view of the upper part of the whistle shown inverted and looking from the mouthpiece end.

The structure of the lanyard receiver 32 shown in FIG. 4 is complemented by a mirror-image shaping on the underside of the first part 36 and this can be seen in FIG. 4. Here it will be evident that the transverse cavity 74 communicates through gap 72 and that on assembly, outer side walls 76, slide into close contact with the inner side walls 66.

The assembly of the parts 36 and 38 is preferably effected by ultrasonic welding. This necessitates the parts to have complementary surfaces where the welding is to take place. Returning to FIG. 3, the part 38 has a peripheral upward facing surface starting at 76 near the mouthpiece inlet opening and passing along the mouthpiece, around the main portion, and along an upward facing surface 78 before returning along the hidden side of the part 38 in a similar fashion to the exposed side. Also, the wall 60 has an upward facing surface 80.

The peripheral surface 76 mates with a corresponding peripheral surface 82 (FIG. 4) on upper part 36, and the surface 78 meets an inner surface of the part 36. As a result ultrasonic welding can be used to weld the parts together while applying a vertical load (as drawn in FIG. 1) to maintain pressure between the surfaces as welding takes place. To better control such welding, one of the mating surfaces will be provided with a small raised bead to concentrate melting and ensure a continuous weld.

The result is a whistle made up of two parts to provide two similar chambers associated with respective splitter edges 28, 30. Each chamber extends axially and terminates in a downward portion between the transverse wall 64 (FIG. 3) and the end wall 70. One of the chambers is in communication with the transverse cavity 74 resulting in an increase in the volume of air available to resonate. As a result the natural frequencies of resonance at the splitter edges 28, 30 are different to cause a beat having an audible relatively high pitched frequency normally associated with a whistle.

The structure of the whistle is such that the requisite frequencies can be achieved in a relatively small structure because the desirable mandolin shape accommodates similar chambers by having the chambers extend axially from the splitter edges and then downwardly with one chamber communicating with the transverse cavity in the lanyard receiver. This arrangement results in a light compact whistle which preferably has a conventional mandolin shape.

It will be evident that the invention can be embodied in a variety of structures and all such structures are within the scope of the invention as claimed.

It is claimed:

1. A whistle for creating two resonant frequencies resulting in a beat, the whistle having upper and lower parts of thermoplastic material, the parts including mating peripheral surfaces welded to one another, and the upper and lower parts combining to define a mouthpiece having an inlet opening and an inlet passageway extending axially from the inlet opening, a main body having two similar chambers and splitter edges associated one with each of the chambers, the chambers extending axially from the splitter edges and then downwardly, and a lanyard receiver extending axially from the main body remote from the mouthpiece and defining a transverse cavity connected to one of the chambers whereby air forced over the splitter edges causes two resonant frequencies which combine to create an audible beat.

2. A whistle as claimed in claim 1 in which the whistle is mandolin shaped.

3. A whistle as claimed in claim 1 in which the lower part defines an air deflector in the mouthpiece to direct incoming air equally towards the respective splitter edges.

4. A whistle as claimed in claim 3 in which the lower part includes an upright wall between the chambers.

* * * * *